(12) United States Patent
Tilton et al.

(10) Patent No.: US 7,679,234 B1
(45) Date of Patent: Mar. 16, 2010

(54) SPRAY COOL MEANS FOR COOLING A MODULAR INVERTER ELECTRIC MOTOR SYSTEM

(75) Inventors: Charles L. Tilton, Colton, WA (US); Bruce A. Smetana, Colton, WA (US); Tom D. Weir, Pullman, WA (US)

(73) Assignee: Isothermal Systems Research, Inc., Liberty Lake, WA (US)

( * ) Notice: Subject to any disclaimer, the term of this patent is extended or adjusted under 35 U.S.C. 154(b) by 370 days.

(21) Appl. No.: 11/603,796

(22) Filed: Nov. 22, 2006

Related U.S. Application Data

(63) Continuation-in-part of application No. 10/991,003, filed on Sep. 25, 2003, now Pat. No. 7,397,154, which is a continuation of application No. 09/962,812, filed on Sep. 24, 2001, now abandoned.

(60) Provisional application No. 60/234,565, filed on Sep. 22, 2000.

(51) Int. Cl.
*H02K 9/10* (2006.01)
*H05K 7/20* (2006.01)

(52) U.S. Cl. .................. 310/54; 361/699; 165/104.33
(58) Field of Classification Search .............. 361/699; 310/54; 165/104.33
See application file for complete search history.

(56) References Cited

U.S. PATENT DOCUMENTS

| | | | | |
|---|---|---|---|---|
| 3,531,668 A | * | 9/1970 | Cathey | 310/58 |
| 3,659,125 A | * | 4/1972 | Basel | 310/54 |
| 3,733,503 A | * | 5/1973 | Potter | 310/68 D |
| 4,329,603 A | * | 5/1982 | Ballard | 310/61 |
| 4,959,570 A | * | 9/1990 | Nakamura et al. | 310/54 |
| 5,220,804 A | * | 6/1993 | Tilton et al. | 62/64 |
| 5,519,269 A | * | 5/1996 | Lindberg | 310/58 |
| 5,682,074 A | * | 10/1997 | Di Pietro et al. | 310/215 |
| 5,714,816 A | * | 2/1998 | Jensen et al. | 310/89 |
| 5,814,909 A | * | 9/1998 | Yamada et al. | 310/64 |
| 6,414,867 B2 | * | 7/2002 | Suzuki et al. | 363/141 |
| 6,529,394 B1 | * | 3/2003 | Joseph et al. | 363/141 |
| 6,571,895 B2 | * | 6/2003 | Weimer | 180/65.1 |
| 7,090,044 B2 | * | 8/2006 | Nakamura et al. | 180/65.8 |
| 7,525,224 B2 | * | 4/2009 | Takenaka et al. | 310/54 |
| 2006/0174642 A1 | * | 8/2006 | Nagashima et al. | 62/259.2 |

FOREIGN PATENT DOCUMENTS

JP 11-018372 A * 1/1999

OTHER PUBLICATIONS

JPO Machine Translation, Sekine, JP 11-018372 A Jan. 1999.*

* cited by examiner

*Primary Examiner*—Burton Mullins
(74) *Attorney, Agent, or Firm*—Lee & Hayes, PLLC

(57) ABSTRACT

In accordance with one embodiment of the present disclosure an apparatus includes a means for converting a first type of electrical power to a second type of electrical power. The apparatus also includes a means for spraying a coolant on the means for converting.

9 Claims, 3 Drawing Sheets

SPRAY COOL MEANS FOR COOLING A MODULAR INVERTER ELECTRIC MOTOR SYSTEM

CROSS REFERENCE TO RELATED APPLICATIONS

This application is a continuation-in-part of application Ser. No. 10/991,003, filed Sep. 25, 2003, now U.S. Pat. No. 7,397,154 which is a continuation of now abandoned application Ser. No. 09/962,812, filed Sep. 24, 2001, which claimed the benefit of provisional Application No. 60/234,565, filed Sep. 22, 2000, all of which are hereby incorporated by reference herein.

BACKGROUND

Various electrical devices are known to those skilled in the art. The performance of at least some known electrical devices has been limited by thermal constraints, including capability to adequately cool part of, or all of, such electrical devices.

DETAILED DESCRIPTION

Figure 1:
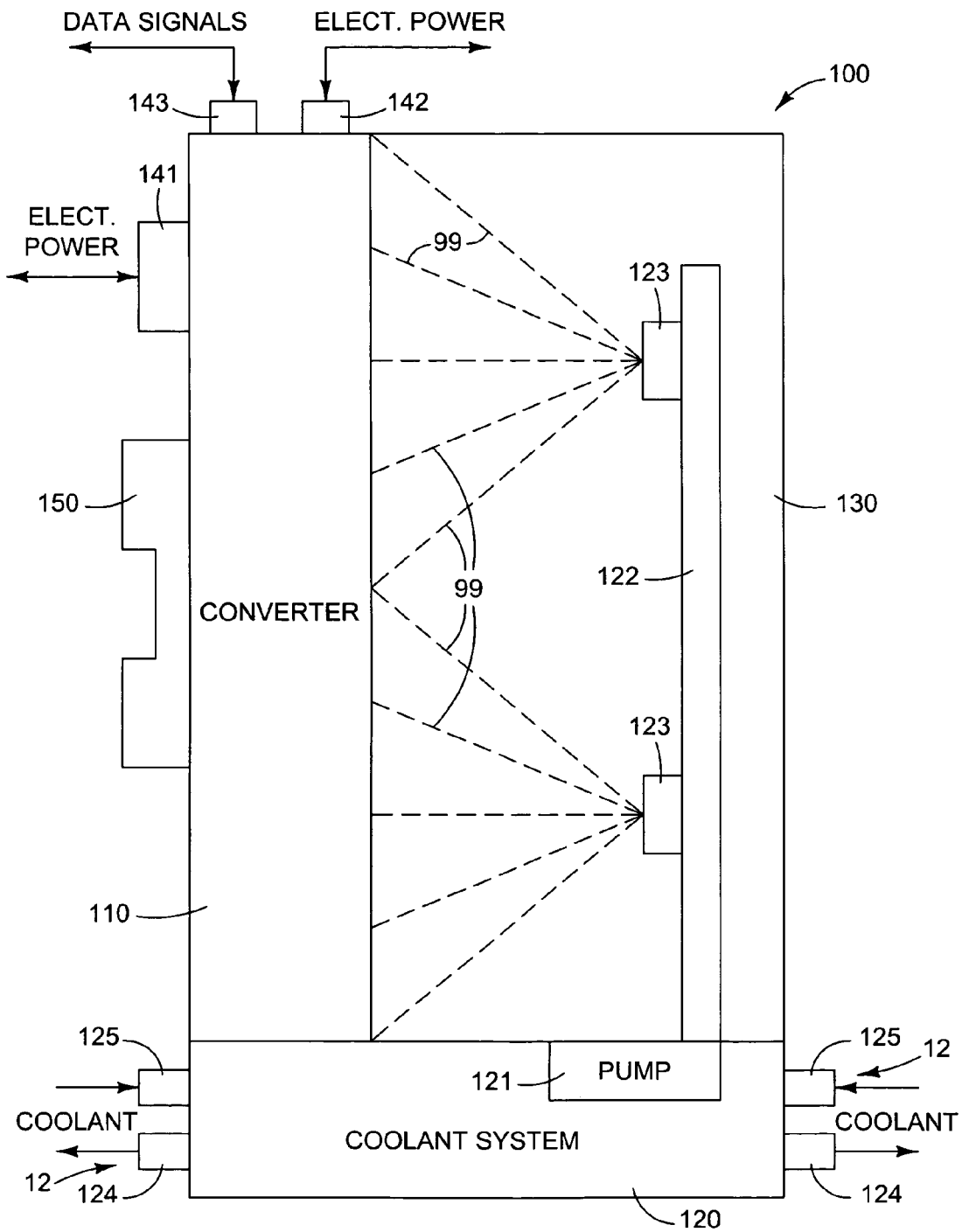
FIG. 1 is a schematic diagram depicting an apparatus in accordance with at least one embodiment of the present disclosure.

With reference to the drawings, FIG. 1 is a schematic diagram of an apparatus 100 in accordance with at least one embodiment of the present disclosure. The apparatus 100 can be configured generally in the manner of a module and/or to be modular, as is described in greater detail further below.

The apparatus 100 includes an electrical power converter 110. The converter 110 is configured to convert or change one type of electrical power to another type of electrical power. By way of example only, the converter 110 can be configured to convert D/C (i.e. "direct current") electrical power to A/C (i.e. "alternating current") electrical power, such as in the manner of devices generally known as "inverters."

By way of further example, the converter 110 can be configured to convert A/C electrical power to D/C electrical power, such as in the manner of devices generally known as "rectifiers." By way of still further example, the converter 110 can be configured to both convert D/C electrical power to A/C electrical power and to convert A/C electrical power to D/C electrical power. The converter 110 can be configured to perform one or more electric motor control functions when employed in conjunction with an electric motor, such as but not limited to electric motor speed control functions. It can also be configured to convert DC power to DC power, at differing voltages.

The apparatus 100 includes a coolant system 120. The coolant system 120 is configured to spray coolant 99 on the converter 110 to thereby facilitate cooling of the converter. The coolant 99 can be in substantially liquid form at least before being sprayed. Further, the coolant 99 can be in substantially liquid form at least as the coolant is being sprayed. In accordance with at least one embodiment of the present invention, the coolant can change from a liquid state to a gas and/or vapor state after the coolant is sprayed on the converter 110, although the liquid can also stay in the liquid state after being sprayed on the converter. Non-limiting examples of the coolant include Fluorinert® (by Minnesota Mining And Manufacturing Company Corporation, Saint Paul, Minn.), water, azeotropic mixtures (such as OS-120 by du Pont de Nemours and Company, Delaware), alcohols, and water glycol mixtures.

The coolant system 120 can include a pump 121, although the pump is not required to practice the invention. By way of example, the coolant system 120 can be configured without the pump 121, and can receive pressurized coolant from an alternative coolant pressurization source (not shown). The coolant system 120 can include a header or coolant distribution pipe 122. The header 122 can be configured to receive pressurized coolant 99 from the pump 121.

The coolant system 120 can include at least one spray nozzle 123. The spray nozzle 123 can be supported on the header 122, and can be connected in fluid communication with the header. The nozzle 123 can be configured to receive pressurized coolant 99 from the header 122. The spray nozzle 122 can also be configured to atomize or otherwise form small particles or droplets of coolant 99, and can be configured to project or spray the particles or droplets of coolant onto at least a portion of the converter 110.

The coolant system 120 can include other components that are not shown, including but not limited to a sump or collection tray to collect coolant 99 after being sprayed onto the converter 110, a filter or strainer, and a valve. The coolant system 120 can include at least one coolant connector portion 12. The coolant connector portion 12 is configured to couple or connect in fluid communication with another coolant connector portion (not shown) as is described in greater detail further below.

The coolant connector portion 12 can include an outlet connector portion 124 and/or can include an inlet connector portion 125. The outlet connector portion 124 and the inlet connector portion 125 can have any of a number of specific configurations in accordance with various embodiments of the present disclosure. By way of example, the outlet connector portion 124 and the inlet connector portion 125 can be arranged in a side-by-side manner as depicted. By way of further example, and although not specifically depicted, the outlet connector portion 124 and the inlet connector portion 125 can be arranged concentrically relative to one another.

The apparatus 100 can include a housing 130. The housing 130 is configured to enclose at least a portion of the converter 110 and at least a portion of the coolant system 120. By way of example, the housing 130 can be configured to facilitate containment of the coolant 99. That is, the housing 130 can be configured to prevent loss of the coolant 99 by at least partially containing the coolant 99. The housing 130 can form at least a portion of a substantially leak-proof enclosure to substantially contain the coolant 99 as depicted.

The housing 130 can be configured to provide structural support for the converter 110 and/or for at least a portion of the coolant system 120. In accordance with at least one embodiment of the present disclosure, the housing 130 is configured to at least partially enclose and to structurally support the converter 110 and the coolant system 120 in the manner of a module. That is, housing 130 can form, along with the converter 110 and the coolant system 120, a substantially modular apparatus 100. That is, the apparatus 100 can be substantially modular in that the apparatus can be substantially self-contained, and/or can be configured to handled as a unit.

The apparatus 100 includes a first electric power port 141. The first electric power port 141 can function as an electric power inlet and/or as an electric power outlet. The first electric power port 141 can be substantially in the form of an electrical connector portion that is configured to electrically connect with another electrical connector portion (not shown). The first electrical power port 141 is in electrical connectivity with the converter 110.

The apparatus 100 includes a second electric power port 142. The second electric power port 142 can function as an electric power inlet and/or as an electric power outlet. The second electric power port 142 can be substantially in the form of an electrical connector portion that is configured to electrically connect with another electrical connector portion (not shown). The second electrical power port 141 is in electrical connectivity with the converter 110.

The apparatus 100 can include a data/signal port 143. The data/signal port 143 can be substantially in the form of a data/signal connector portion that is configured to couple and/or connect in data/signal communicative linkage with another data/signal connector portion (not shown). The data/signal port 143 is configured to allow data and/or other types of signals to be transmitted from and/or received by the converter 110.

The apparatus 100 can include a mounting feature 150. The mounting feature 150 can be defined on the apparatus 110. Alternatively, the mounting feature 150 can be a component that is fastened or otherwise attached to the apparatus 100. The mounting feature 150 is configured to facilitate fastening and/or alignment of the apparatus 100 relative to another device (not shown) such as an electric motor or the like, as is described below.

In accordance with at least one embodiment of the present disclosure, the first electrical power port 141 and/or the coolant connector portion 12 can be integral with the mounting feature 150. That is, in accordance with at least one embodiment of the present disclosure, the first electrical power port 141 and/or the coolant connector portion 12 can form a substantially integral unit.

The apparatus 100 can be operated in a manner whereby the converter 110 receives a first type of electrical power from a power source (not shown) and then converts the first type of electrical power to a second type of electrical power, and then supplies the second type of electrical power to another device (not shown), such as (but not limited to) an electric motor. During such operation, the apparatus 100 can be further operated whereby the coolant system 120 sprays coolant 99 onto the converter 110 to thereby facilitate cooling of the converter.

Figure 2:
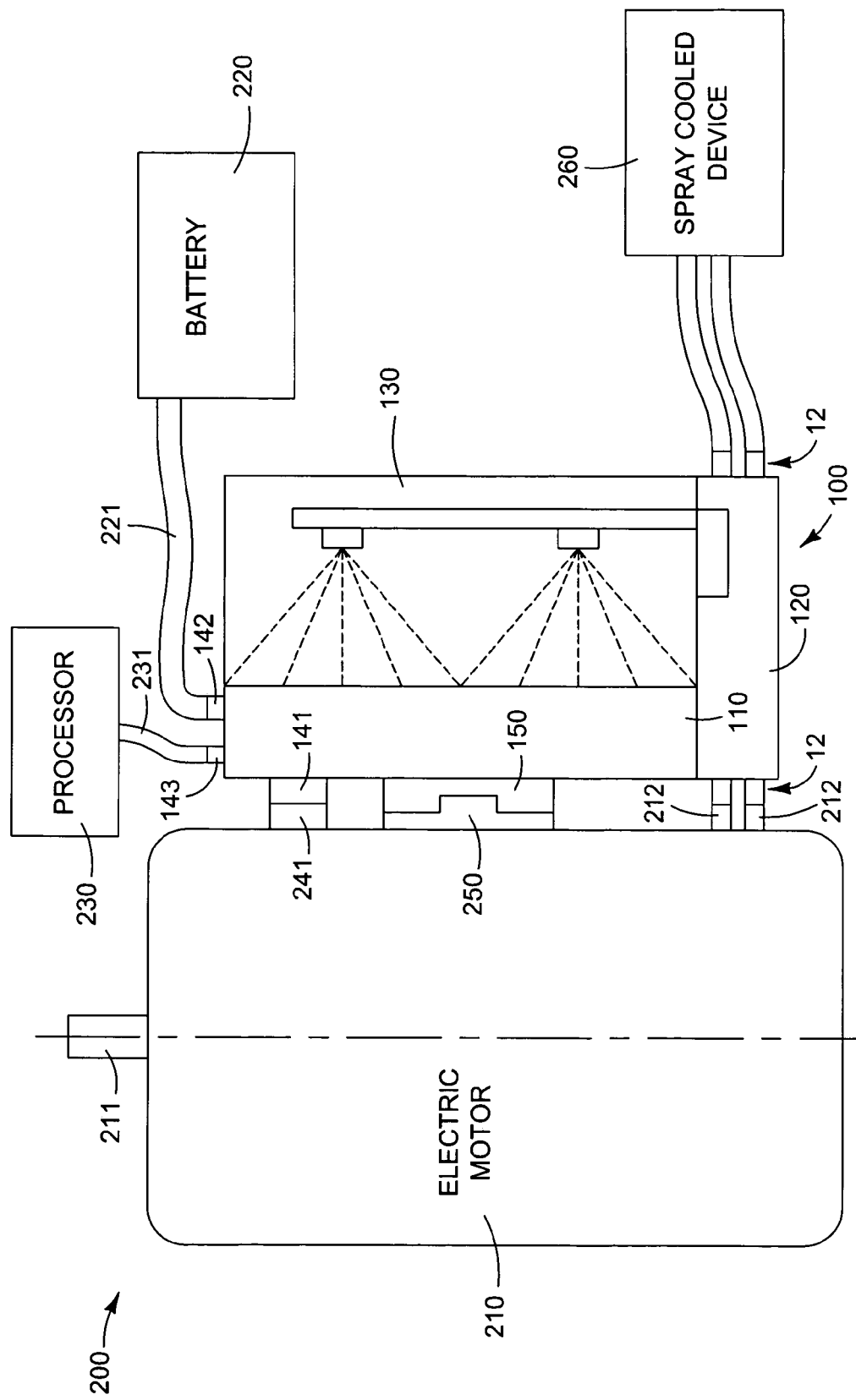
FIG. 2 is another schematic diagram depicting an apparatus in accordance with one embodiment of the present disclosure.

With further reference to the drawings, FIG. 2 is another schematic diagram depicting an apparatus 200 in accordance with at least one embodiment of the present disclosure. The apparatus 200 can include the apparatus 100, which is described above in detail with respect to FIG. 1. With continued reference to FIG. 2, the apparatus 200 includes an electric motor 210. The electric motor 210 can be configured to draw electrical power to produce mechanical power output. That is, the electric motor 210 can be configured to change electrical power into mechanical power.

The electric motor 210 can have any of a number of possible configurations, such as that of a rotary electric motor with an output shaft 211, as is depicted. However it is to be understood that the electric motor 210 does not need to be in the form of a rotary electric motor to practice the invention. Moreover, the electric motor 210 can be configured to operate on any of a number of possible types of electrical power. By way of example only, the electric motor 210 can be configured to operate on A/C electrical power, or alternatively can be configured to operate on D/C power.

Furthermore, the electric motor 210 can be configured to produce electrical power output from mechanical power input. That is, by way of example only, the electric motor 210 can be configured to operate in the manner of an alternator to produce A/C electrical power output from mechanical input. By way of further example, the electric motor 210 can be configured to operate in the manner of a D/C generator to produce D/C electrical power output from mechanical power input. In accordance with at least one embodiment of the present disclosure, the electric motor 210 is configured to both operate on electrical power to produce mechanical power output, and to produce electrical power output from mechanical power input.

The apparatus 100 can be electrically connected to the motor 210. The apparatus 100 can be electrically connected to the motor 210 by way of the first electric power port 141. In accordance with at least one embodiment of the present disclosure, the electric motor 210 can include a motor power port 241 that is configured to electrically couple with the first electric power port 141 to thereby enable electrical power to flow between the apparatus 100 and the electric motor 210. In accordance with at least one embodiment of the present disclosure, the electric motor 210 can draw electrical power from the apparatus 100 for operation, wherein the electric motor produces mechanical power from electrical power.

The apparatus 100 can be attached and/or mounted to the electric motor 210, as is depicted. It is to be understood, however, that the electric motor 210 and the apparatus 100 do not need to be attached and/or mounted to one another in order to practice the invention. In accordance with at least one embodiment of the present disclosure, the apparatus 100 can be supported by the electric motor 210.

The apparatus 100 can be configured to connect in fluid communication with the electric motor 210. However, it is to be understood that the apparatus 100 does not need to be configured to connect in fluid communication with the electric motor 210 to practice the disclosures provided herein. In accordance with at least one embodiment of the present disclosure, the electric motor 210 includes a fluid connector portion 212 that is configured to couple in fluid communication with the connector portion 12 to thereby enable coolant to flow between the apparatus 100 and the electric motor 210. In accordance with at least one embodiment of the present disclosure, the electric motor 210 is a spray cooled electric motor, and the apparatus 100 is configured to supply coolant to the electric motor.

The apparatus 200 can include a battery 220 that is configured to store electrical power. The apparatus 200 can include an electric power link 221 that can be substantially in the form of an electric cable or the like. The electric power link 221 is configured to electrically connect the battery 220 with the converter 110 by way of the second electric power port 142. That is, by way of example only, the electric power link 221 can be configured to electrically couple or connect with the second electric power port 142. In this manner, electrical power can be exchanged between the battery and the converter 110.

The electric motor 210 can include an external mounting feature 250. The external mounting feature 250 can be configured to facilitate attachment of the apparatus 100 to the electric motor 210 and/or to facilitate support of the apparatus by the motor. In accordance with at least one embodiment of the present disclosure, the external mounting feature 250 is configured to align and engage the mounting feature 150.

In accordance with at least one embodiment of the present disclosure, the apparatus 200 is configured so that engagement of the mounting feature 150 with the external mounting feature 250 results in substantial alignment of the first electrical power port 141 with the motor power port 241, and/or results in substantial alignment of the coolant connector portion 12 with the fluid connector portions 212. It is to be understood that in accordance with various specific embodiments of the present disclosure, the apparatus 100, when supported by and/or when mounted on the electric motor 210, can have any of a number of positions and/or orientations relative to the electric motor.

The apparatus 200 can include a processor 230. The processor 230 is configured to perform signal-processing functions and/or to store data for retrieval. Signal-processing functions can include, for example, control functions. By way of example only, the processor 230 can be in the form of a microprocessor, or a central processing unit ("CPU"), or a computer.

The apparatus 200 can include a data/signal link 231 that can be substantially in the form of a data/signal cable or the like. The data signal link 231 is configured to communicatively link the processor 230 with the converter 110 for data and/or signal communication there between. The data/signal link is configured to communicatively link the processor 230 with the converter 110 by way of the data/signal port 143. That is, by way of example only, the data/signal link 231 can be configured to electrically couple or connect with the data/signal port 143. In this manner, data and/or signals can be exchanged between the processor 230 and the converter 110.

The apparatus 200 can include a spray cooled electronic device 260, which is not an electric motor. In accordance with at least one embodiment of the present disclosure, the spray cooled device is configured to be connected in fluid communication to the apparatus 100 by way of one of the coolant connector portions 12, as depicted. By way of example only, the spray cooled device 260 can be configured to connect in fluid communication with the coolant connector portion 12, as is depicted, to thereby enable coolant to flow between the apparatus 100 and the spray cooled device. The spray cooled device 260 can include and/or can be substantially in the form of, but need not be limited to, one or more of a processor or an actuator.

The apparatus 200 can be operated in a manner whereby the battery 220 supplies a first type of electrical power, such as D/C electrical power, to the apparatus 100 via the electric power link 221. The apparatus 100 can operate in the manner described above, wherein the first type of electrical power is converted to a second type of electrical power, such as A/C electrical power. The second type of electrical power can be supplied to the electric motor 210 via the first electrical power port 141 and the motor power port 241 to facilitate operation of the electric motor.

When the electric motor 210 is a spray cooled electric motor, then during operation of the apparatus 200, the apparatus 100 can supply coolant to the electric motor 210 via the coolant connector portion 12 and the fluid connector portions 212 to thereby facilitate spray cooling of the electric motor. Operation of the apparatus 200 can continue with the operation of the electric motor 210 to produce mechanical power via the output shaft 211.

Further operation of the apparatus 200 can include the transmission of data/control signals from the processor 230 to the apparatus 100 via the data/signal link 231 and the data/signal port 143. Data/control signals transmitted by the processor 230 can, by way of example only, be configured to control the frequency of the A/C electrical power produced by the converter 110. By way of further example, the data/control signals transmitted by the processor 230 can be configured to control the level of power produced by the converter 110.

Figure 3:
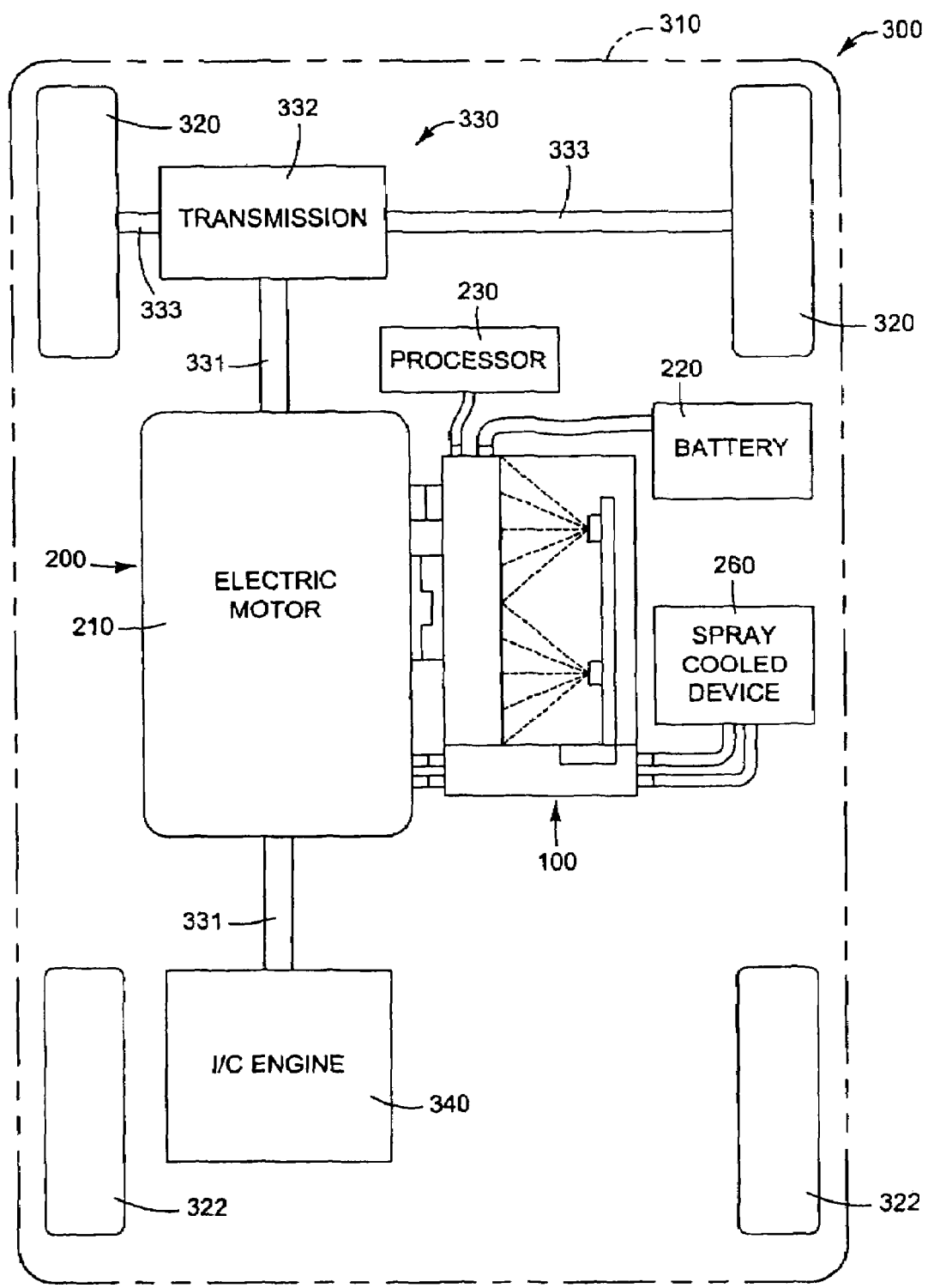
FIG. 3 is yet another schematic diagram depicting an apparatus in accordance with one embodiment of the present disclosure.

With continued reference to the drawings, FIG. 3 is a schematic diagram depicting an apparatus 300 in accordance with one or more embodiments of the present disclosure. In accordance with at least one embodiment of the present disclosure, the apparatus 300 is substantially in the form of a motor vehicle as is depicted. The apparatus 300 can include a vehicle chassis 310. The apparatus 300 can include the apparatus 200, which is described above with respect to FIGS. 1 and 2. With continued reference to FIG. 3, the apparatus 200 can be supported by the vehicle chassis 310.

The apparatus 300 can include at least one drive wheel 320, which can be operatively supported by the chassis 310. The apparatus 300 can also include one or more non-driven wheels 322, which can be operatively supported on the chassis 310. The apparatus 300 can include a drive line assembly 330, which can be operatively supported by the chassis 310. The drive line assembly 330 can be mechanically connected to the electric motor 210 and to the drive wheel 320 to thereby enable mechanical power transfer between the electric motor and the drive wheel to thereby cause the apparatus 300 to be propelled in the manner of a motor vehicle.

The drive line assembly 330 can include at least one drive shaft 331, which is operatively connected between the electric motor 210 and the drive wheel 320. The drive line assembly 330 can include at least one transmission 332, and/or can include at least one drive axle assembly 333, each of which can be operatively connected between the electric motor 210 and the drive wheel 320 to thereby facilitate mechanical power transfer between the electric motor 210 and the drive wheel 320 to thereby enable the drive wheel to be driven.

The apparatus 300 can further include an internal combustion engine 340. In accordance with at least one embodiment of the present disclosure, the internal combustion engine 340 can be connected to the electric motor 210 by way of a drive shaft 331 or the like to thereby facilitate mechanical power transfer between the internal combustion engine and the electric motor 210. In accordance with another embodiment of the present disclosure, the internal combustion engine 340 can be connected with the drive wheel 320 by way of the drive line assembly 330 to thereby facilitate transfer of mechanical power from the internal combustion engine to the drive wheel to thereby enable the drive wheel to be driven.

The apparatus 300 can be operated in a manner whereby apparatus 200 is operated to cause the electric motor 210 to produce mechanical power from a first type of electrical power supplied by a battery pack 221. The mechanical power produced by the electric motor 210 can be supplied to the drive wheel 320 via the drive line assembly 330 to thereby cause the drive wheel to rotate. Rotation of the drive wheel 320 can thereby cause the apparatus 300 to be propelled, for example, along a roadway.

The internal combustion engine 340 can be operated to produce additional mechanical power that can be supplied to the road wheel 320 via the drive line assembly 330. This mode of operation can be useful to supplement (or even replace) the electric motor 210 as the power source for the drive wheel 320, for example in cases of high load (e.g., high speeds, climbing hills, etc.), or if the battery pack 221 contains insufficient charge to drive the electric motor 210 under the then-present demand.

In an alternative mode of operation, the internal combustion engine 340 can be operated to supply mechanical power to the electric motor 210, whereby the electric motor is driven in the manner of an alternator to produce A/C electrical power. In this way the internal combustion engine 340 can then be used to charge the battery pack 221.

The A/C electrical power produced by the electric motor 210, when driven by the internal combustion engine 340, can be supplied to the apparatus 100, whereby the converter (shown in FIGS. 1 and 2) can operate to convert the A/C electrical power to D/C electrical power and to thereby supply the D/C electrical power to the battery pack 221 to thereby charge the battery pack.

In accordance with at least one embodiment of the present disclosure, a method of converting electrical power includes providing a converter, such as the converter 110 described above with respect to FIG. 1. The method includes supplying a first type of electrical power to the converter and causing the converter to convert the first type of electrical power to a second type of electrical power. By way of example, the converter can be configured to operate in the manner of an inverter, wherein the first type of electrical power is D/C electrical power and the second type of electrical power is A/C electrical power. By way of further example, the converter can be configured to operate in the manner of a rectifier or the like, wherein the first type of electrical power is A/C electrical power and the second type of electrical power is D/C electrical power. Still further, the converter can be configured as a transformer, wherein the first type of electrical power is D/C (or A/C) electrical power at a first voltage, and the second type of electrical power is D/C (or A/C) electrical power at a second voltage (i.e., as a "step-up" or "step-down" transformer).

The method further includes spraying coolant on the converter. The coolant can be sprayed on the converter by way of a coolant system such as the coolant system 120, described above with respect to FIG. 1. The method can also include providing an electric motor, such as the electric motor 210 described above with respect to the figures. The method can include supplying the second type of electrical power to the electric motor to thereby cause the electric motor to operate and/or to produce mechanical power from the electrical power.

The preceding description has been presented only to illustrate and describe exemplary methods and apparatus of the present invention. It is not intended to be exhaustive or to limit the disclosure to any precise form disclosed. Many modifications and variations are possible in light of the above teaching. It is intended that the scope of the invention be defined by the following claims.

What is claimed is:

1. An apparatus, comprising:
an electric motor configured to operate on a first type of electrical power; a converter electrically connected to the motor, and configured to convert a second type of electrical power to the first type of electrical power to thereby supply power to the electric motor; and
a coolant system configured to spray coolant on the converter and on the electric motor;
a housing configured to enclose at least a portion of the converter and the coolant system;
a converter module comprising the housing, the converter, and the coolant system, wherein the converter module is configured to be removably mounted on the electric motor;
a first fluid connector portion supported on the converter module; and
a second fluid connector portion supported on the motor, wherein the first fluid connector portion and the second fluid connector portion are configured to couple in fluid communication in response to mounting the converter module on the electric motor to thereby connect in fluid communication the coolant system with the electric motor.

2. The apparatus according to claim 1, wherein:
the coolant system comprises a pump and a spray nozzle connected in fluid communication with the pump, and the nozzle is configured to spray coolant on the converter; and
the apparatus further comprises at least one coolant connection configured to enable the coolant system to supply coolant to the electric motor.

3. The apparatus according to claim 1, further comprising:
a first mounting feature defined on the converter module; and
a second mounting feature defined on the electric motor, wherein the first and second mounting features are configured to engage to thereby mount the converter module on the electric motor.

4. The apparatus according to claim 1, further comprising:
a first electrical connector portion supported on the converter module; and
a second electrical connector portion supported on the electric motor, wherein the first electrical connector portion and the second electrical connector portion are configured to electrically couple in response to mounting the converter module on the electric motor to thereby electrically connect the converter with the electric motor.

5. An apparatus, comprising:
a chassis;
at least one drive wheel supported by the chassis;
an electric motor configured to operate on a first type of electrical power, and supported by the chassis, and connectable with the drive wheel to thereby drive the drive wheel;
a converter module configured to be removably mounted on the motor and comprising:
a converter electrically connected to the electric motor, and configured to convert a second type of electrical power to the first type of electrical power to thereby supply power to the electric motor;
a coolant system configured to spray a coolant on the converter; and
a housing configured to enclose at least a portion of the converter and the coolant system;
a first fluid connector portion supported on the converter module; and
a second fluid connector portion supported on the motor, wherein the first fluid connector portion and the second fluid connector portion are configured to couple in fluid communication in response to mounting the converter module on the electric motor to thereby connect in fluid communication the coolant system with the electric motor.

6. The apparatus according to claim 5, wherein:
the electric motor is a spray cooled electric motor; and the coolant system is connected in fluid communication to the motor to thereby supply coolant to the motor.

7. The apparatus according to claim 6, wherein the coolant system is connected in fluid communication to a spray cooled electronic device to thereby supply coolant to the spray cooled device.

8. The apparatus according to claim 5, wherein:
the coolant system is connected in fluid communication to the electric motor to thereby supply coolant to the electric motor; and the coolant system is connected in fluid communication to a spray cooled electronic device to thereby supply coolant to the spray cooled device.

9. A hybrid vehicle, comprising:

a chassis;

a plurality of wheels supported by the chassis, wherein at least one of the wheels is a drive wheel configured to propel the vehicle;

an electric motor configured to operate on a first type of electrical power, and supported by the chassis, and connectable with the drive wheel to thereby drive the drive wheel;

a converter module comprising:
  a converter electrically connected to the electric motor, and configured to convert a second type of electrical power to the first type of electrical power to thereby supply power to the electric motor;
  a coolant system configured to spray a coolant on the converter; and
  a housing configured to enclose at least a portion of the converter and at least a portion of the coolant system;

a first fluid connector portion supported on the converter module; and a second fluid connector portion supported on the electric motor, wherein the first fluid connector portion and the second fluid connector portion are configured to couple in fluid communication in response to mounting the converter module on the electric motor to thereby connect in fluid communication the coolant system with the electric motor;

an internal combustion engine mechanically connected to the electric motor; and a battery configured to receive power from, and provide power to, the electric motor.

* * * * *